US009083516B2

(12) United States Patent
Chiesa et al.

(10) Patent No.: US 9,083,516 B2
(45) Date of Patent: Jul. 14, 2015

(54) SECURING VIRTUAL LANE PHYSICAL LAYERS

(71) Applicant: Cisco Technology, Inc., San Jose, CA (US)

(72) Inventors: Luca Della Chiesa, Concorezzo (IT); Gilberto Loprieno, Milan (IT); Giacomo Losio, Tortona (IT)

(73) Assignee: Cisco Technology, Inc., San Jose, CA (US)

( * ) Notice: Subject to any disclaimer, the term of this patent is extended or adjusted under 35 U.S.C. 154(b) by 61 days.

(21) Appl. No.: 13/910,347

(22) Filed: Jun. 5, 2013

(65) Prior Publication Data

US 2014/0362989 A1   Dec. 11, 2014

(51) Int. Cl.
*H04L 9/12* (2006.01)
*H04B 10/25* (2013.01)
*H04L 9/08* (2006.01)

(52) U.S. Cl.
CPC *H04L 9/12* (2013.01); *H04B 10/25* (2013.01); *H04L 9/0855* (2013.01); *H04L 2209/24* (2013.01)

(58) Field of Classification Search
None
See application file for complete search history.

(56) References Cited

U.S. PATENT DOCUMENTS

| 4,817,146 A * | 3/1989 | Szczutkowski et al. ...... 380/261 |
| 2009/0189794 A1* | 7/2009 | Baumer ........................... 341/95 |
| 2013/0039182 A1* | 2/2013 | Das et al. ....................... 370/235 |

OTHER PUBLICATIONS

Matharu, "100G Dual Gearbox: Improving Port Density on Line Cards in Core Network Equipment," Xilinx WP413 (v1.0), White Paper: Virtex-7 HT FPGAs, Mar. 1, 2012, 10 pages.
Ixia, "Enabling 100 Gigabit Ethernet Implementing PCS Lanes," White Paper, May 2009, 14 pages.

* cited by examiner

*Primary Examiner* — Jung Kim
*Assistant Examiner* — Janusz Kusyk
(74) *Attorney, Agent, or Firm* — Edell, Shapiro & Finnan, LLC (57) ABSTRACT

A data stream with a given data rate is distributed into a plurality of virtual lanes or streams, each with a lower data rate than the data stream. Virtual lanes permit the use of lower cost electronics at the optical-electrical conversion points. Security information is generated that includes a unique initialization vector. The security information is distributed or allocated across some or all of the of the virtual data streams in a virtual lane alignment marker in a portion of the alignment marker used to maintain direct current (DC) transmission balance, but that otherwise does not provide useful information.

20 Claims, 12 Drawing Sheets

SECURING VIRTUAL LANE PHYSICAL LAYERS

TECHNICAL FIELD

The present disclosure relates to encrypting virtual lanes for data streams for transmission over an optical transport network.

BACKGROUND

Higher-speed Ethernet typically has to use existing copper (electrical) and fiber (optical) cables, e.g., in a data center and over the Internet. At this point in time, no technology exists to transport 40 or 100 GbE as a single stream over both copper and fiber media between endpoints, but such transport becomes possible when the traffic is subdivided and transmitted via a plurality of lower data rate channels or virtual lanes. To assist the conversion between optical and electrical transmission, the Institute of Electrical and Electronics Engineers (IEEE) has established the 802.3ba standard for 40 Gigabit Ethernet (GbE) and 100 GbE for transmission over networks, e.g., the Internet. The 802.3ba standard implements the use of "virtual lanes" that subdivide the higher data rate optical signals for processing by lower data rate electronics at the physical coding sublayer (PCS). For example, a 40 GbE optical data rate may be subdivided into 5 GbE PCS units or lanes for electrical processing. In essence the 40 GbE data are distributed across 5 GbE lanes, e.g., eight lanes (40 GbE divided by 5 GbE). However, due to the long optical transmission distances, e.g., measuring in the hundreds of miles or kilometers, optical networks often traverse geographic regions that may present security problems such as data interception.

DESCRIPTION OF EXAMPLE EMBODIMENTS

Overview

Techniques are described herein for distributing line encoded data blocks of a first data stream across a plurality second data streams at a transmitting device such that the second data streams can be processed at a data rate lower than a data rate associated with the first data stream. A fixed amount of data in each of the second data streams is encrypted to obtain a plurality of corresponding encrypted blocks in each of the second data streams. A plurality of synchronization markers are generated that are configured with information to allow synchronization, alignment, and decryption of the plurality of encrypted blocks at a receiving device. One or more synchronization markers are added to each of the second data streams in preparation for transmission. Ultimately, the plurality of encrypted blocks and the markers are transmitted.

Example Embodiments

Optical networks generally comprise a number of optical fibers that are deployed over large geographical areas. At times, the optical fibers are deployed in areas (e.g., unfriendly or hostile territories/countries) where it is difficult to ensure secure data transmission across the fibers. Given the large geographical area covered by optical networks, and the potentially unfriendly territories in which the optical fibers are deployed, optical networks may be exposed to eavesdroppers, hijackers, or other security threats. As such, operators protect the optical network payloads by adding security to the transmitted traffic, particularly for sensitive applications (e.g., datacenter long range connections, cloud computing, financial and military networks, etc.).

Optical transport is quickly moving towards 100 Gbps implementations that can be widely deployed in the next few years, and solutions for 400 Gbps and 1 terabits per second (Tbps) transport have been announced. As such, it is expected that further optical network standards will be released that support these and other line rates and signal speeds.

As described above, networks have been developed to employ both optical and electrical media for data transmission, and the optical data rates have evolved to transmit data at higher rates over an optical physical (PHY) link than those economically achieved over an electrical PHY link. In many environments optical signals are converted to electrical signals, and vice versa. For example, certain optical wavelengths (λ) may be "dropped" at an optical network node. The data in the dropped wavelength are converted from the optical form and may be retransmitted over an electrically based network. The optical wavelengths may also need to be reconditioned via electrical processing due to optical path signal loss and optical distortions, and thereafter retransmitted over optical media. Due to the cost of the electrical conversion components, lower data rate electronics are preferred in some environments. To compensate for the variations in speed between optical and copper networks, PCS virtual lanes are employed, as mentioned above.

Figure 1:
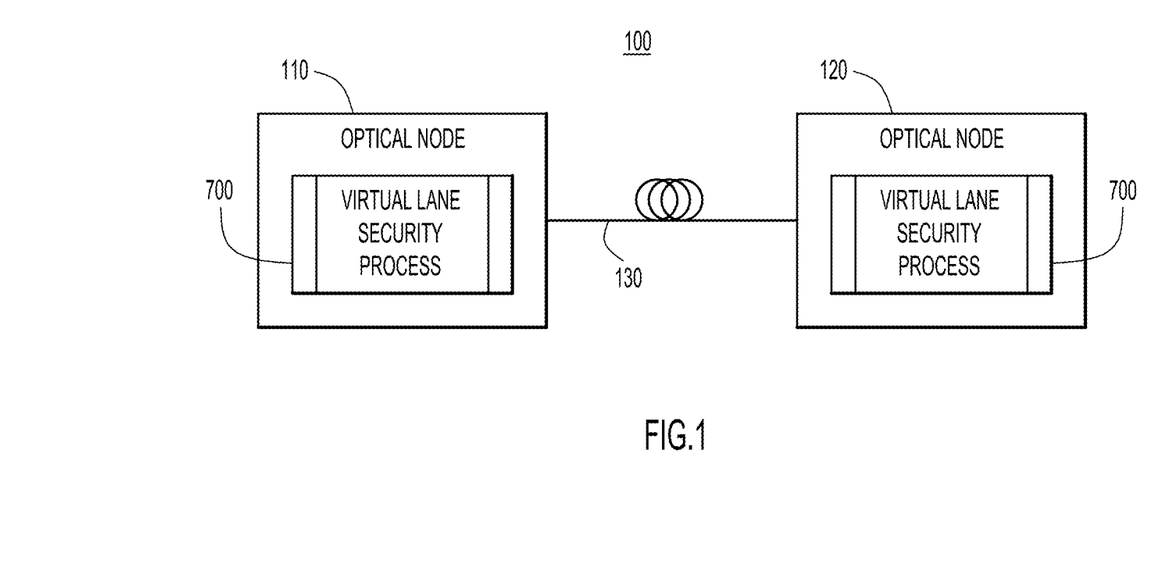
FIG. 1 is a block diagram of an example optical network that provides PCS virtual lane security between optical nodes according to the techniques presented herein.

En example optical environment for adding security to PCS virtual lanes is shown in FIG. 1. The environment, as indicated by reference numeral 100, has two optical nodes 110 and 120. Nodes 110 and 120 are coupled by one or more optical fibers 130. Environment 100 is a simplified environment and it should be understood that many other optical nodes may exist in environment 100. In this regard, nodes 110 and 120 may be part of, e.g., a Metropolitan Area Network (MAN), Wide Area Network (WAN), or other optical network. Similarly, optical nodes are simplified and may contain many other components, such as optical-to-electrical (O/E) converters, electrical to optical (E/O) converters, splitters, combiners, routers, amplifiers, attenuators, transceivers, processors and storage components, among other components.

Optical fibers 130 are typically single mode fibers and may comprise any number and type of optical fibers.

To provide PCS virtual lane security, the optical nodes employ a virtual lane security process 700. Virtual lane security process 700 is described using various levels of detail in the remaining figures with a general method described in connection with FIG. 7, and may be referred to herein simply as process 700. Process 700 encrypts blocks of data for transmission between optical nodes, e.g., nodes 110 and 120, and provides for a decryption process at the receiving end. Briefly, process 700 encrypts blocks of data on a per PCS lane basis and adds certain decryption information to PCS lane markers that are used between data blocks. Since the lanes may be transmitted using various optical wavelengths (λs), they do not necessarily arrive at the destination at the same time. For example, in a 100 GbE LR4 optical line, 4 wavelengths operate at 25 Gbit/s on the same fiber. The different λs travel with slightly different speed in the fiber and the channels will arrive with a skew, e.g., due to dispersion effects. Some skew can also be present on electrical traces on the electronic Printed Circuit Boards (PCBs). The lane markers provide for time synchronization at the far end, e.g., to align lanes for combining into the higher data rate traffic that was distributed across lower data rate PCS lanes. In other words, the PCS markers preform an alignment or de-skewing function, as well as provide decryption information according embodiments described herein.

Figure 2A:
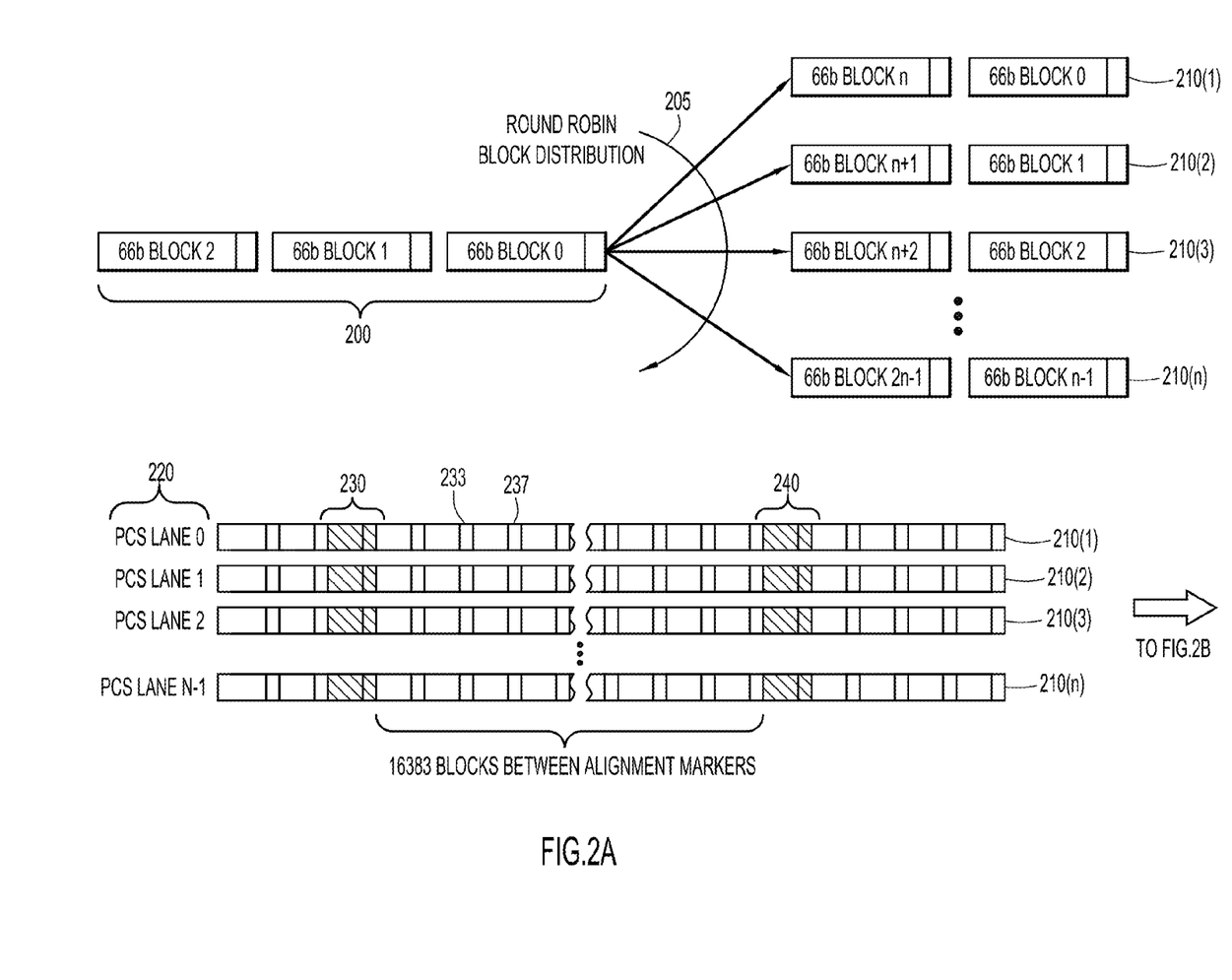
FIGS. 2A-2D are schematic diagrams illustrating the addition of security information to PCS virtual lane markers by a first optical node according to a PCS virtual lane security process for encrypted PCS data streams.

FIGS. 2A, 2B, 2C, and 2D provide a schematic diagram conceptually depicting techniques for encrypting PCS data blocks and adding decryption information to PCS lane markers. Referring to FIG. 2A, a plurality of 66b data blocks 200 are distributed across a plurality of PCS lanes 210(1)-210(n). The 66b data blocks comprise 64 bits of data per a PCS line encoding scheme. The 64/66 PCS encoding scheme uses 66 bits to transmit 64 bits or eight bytes of data. The two extra bits of data in excess of the 64 bits are used to signal whether the 64 bits are all data or have control information that may include data. The plurality of PCS lanes 210 are shown in linear fashion collectively at 220. Each PCS lane 210(1)-210(n) has, e.g., 16,383 66b data blocks delimited by lane markers 230 and 240.

Figure 2B:
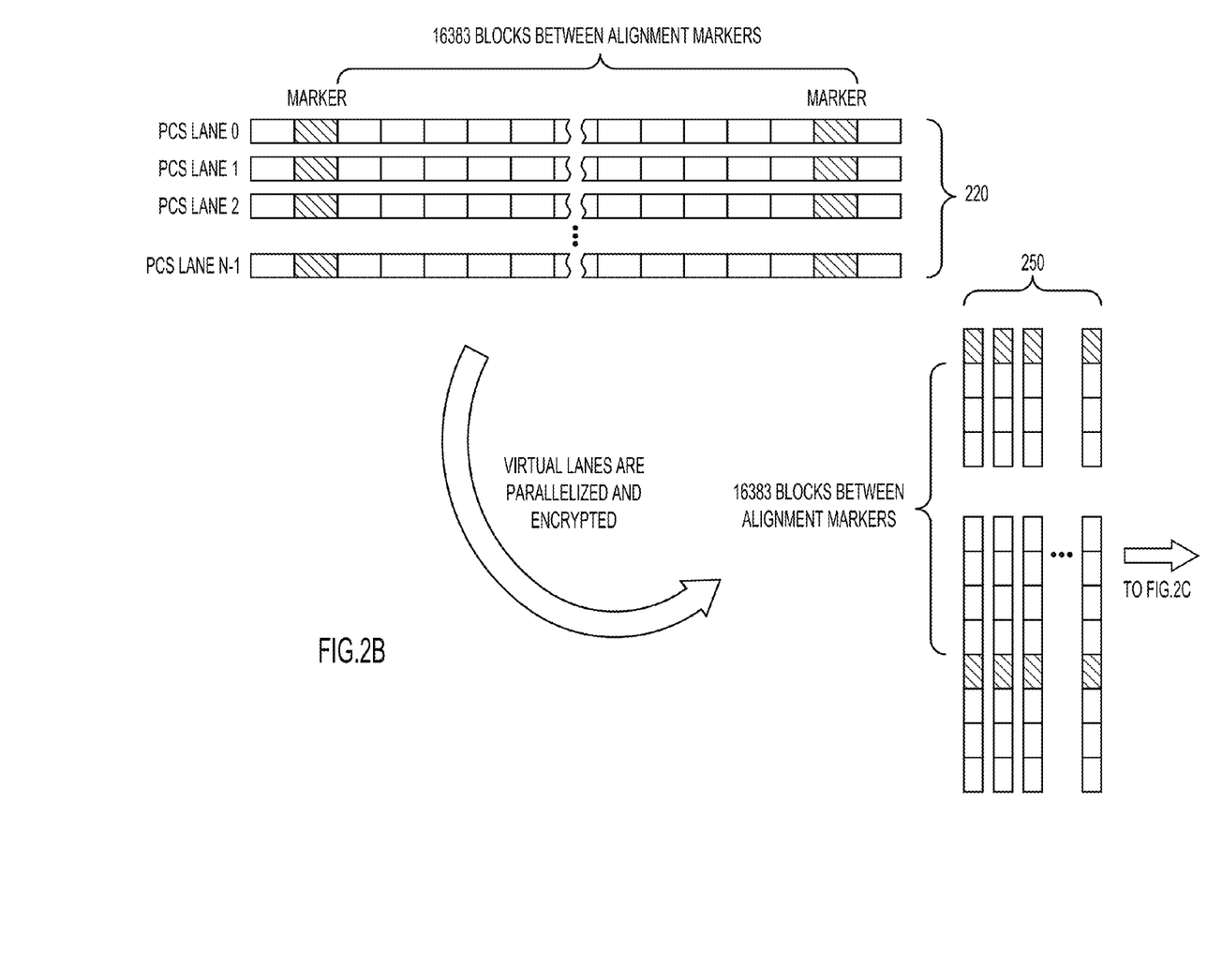
Figure 2C:
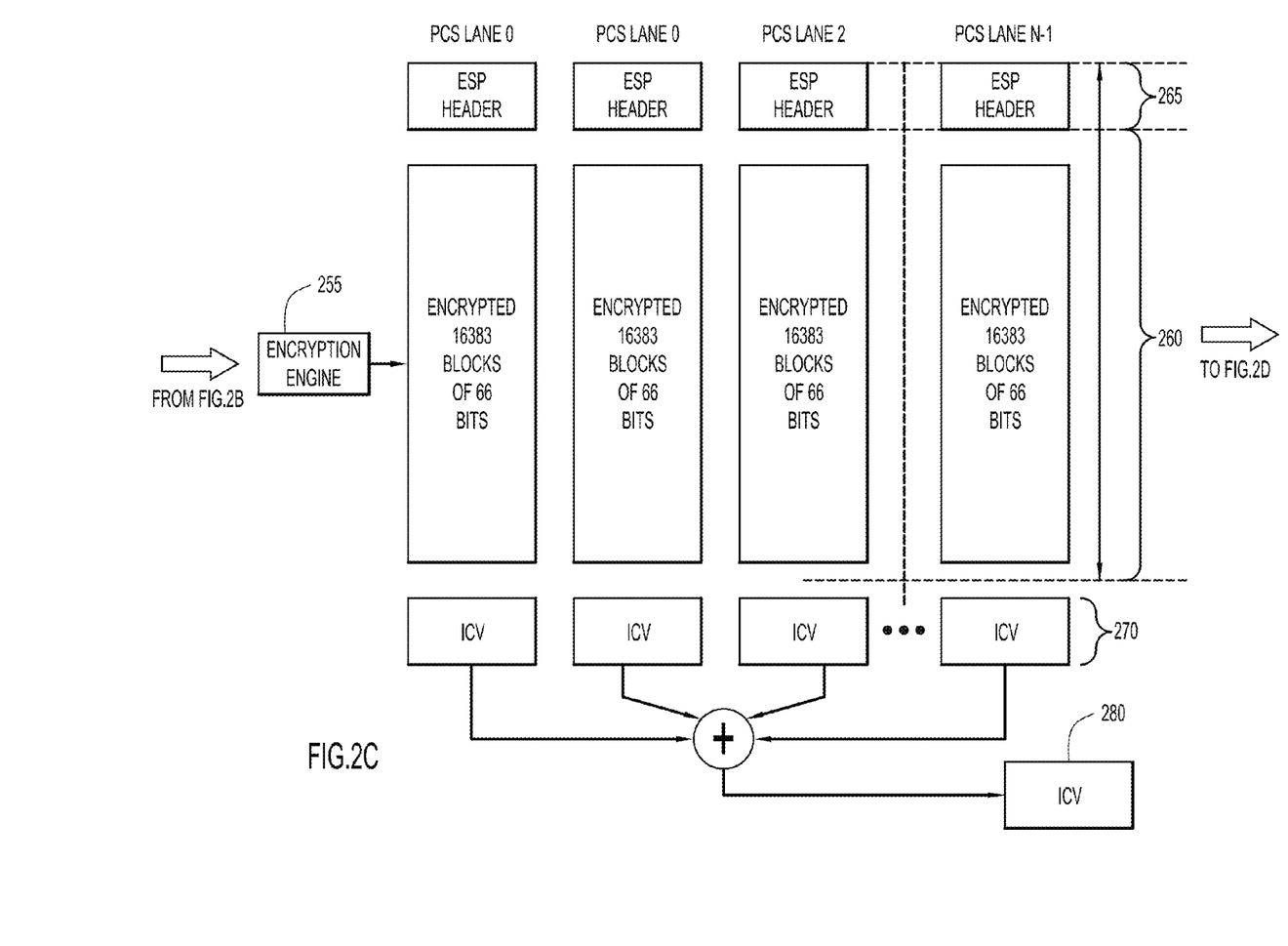

PCS lane processing is depicted in FIG. 2B, which shows how the PCS lanes 220 are rotated visually into parallel lanes 250. The rotation is shown to illustrate conceptually what happens electronically within the PCS encoding circuitry, but may be supplied by using rows as columns when the data are stored in a matrix-like format, i.e., conceptual or actual matrix inversion. PCS lane processing continues in FIG. 2C. FIG. 2C depicts an encryption engine 255 used to encrypt the parallel lanes and are shown collectively at 260. Certain encryption and authentication algorithms may be implemented in current silicon technology up to a line rate of approximately 10 Gbps, but are difficult to implement at higher line rates. Additionally, higher security level algorithms that require complex calculations are generally not practical with current silicon technology at or above 10 Gbps. As such, the high data rates of optical networks present a challenge to data security and authentication using current silicon technology for which the example 5 GbE PCS lanes facilitate. It should be understood that the data rates described herein for both optical and electrical (silicon) media will increase at differing rates over time.

Figure 2D:
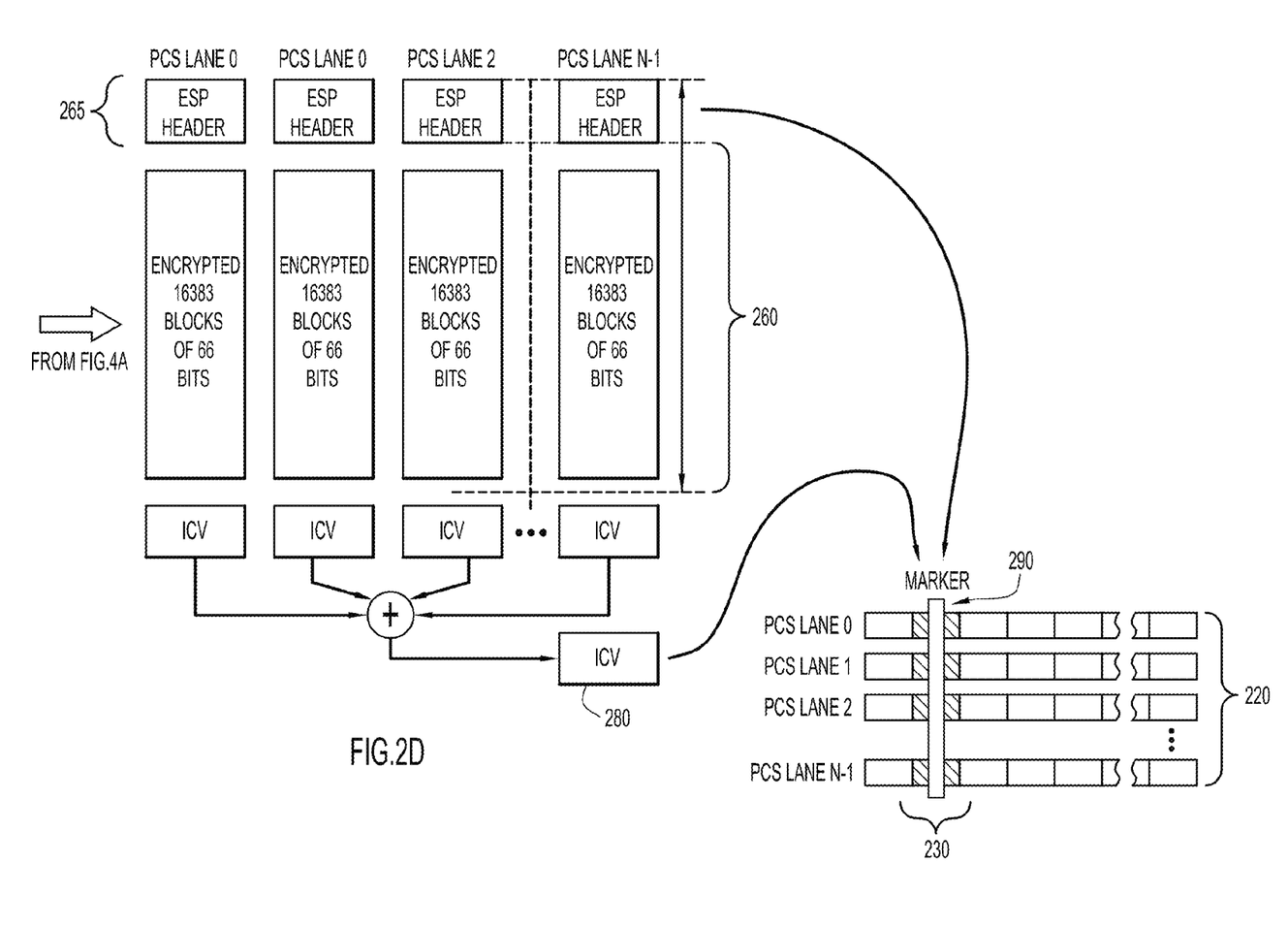

After encryption, header and trailer information may be added to the encrypted data 260. In this example, an Encapsulation Security Payload (ESP) header 265 and Integrity Check Values (ICVs) 270 are added to encrypted data 260. In another example, the ICVs 270 may be combined using a Boolean exclusively OR (XOR) operation to produce a combined ICV 280. In FIG. 2D the ESP header 265 and combined ICV 280 are added to data fields within PCS lane markers, e.g., lane markers 230, for PCS lanes 220. For example, portions of ESP header 265 and combined ICV 280 are distributed across the plurality of PCS lane markers 230, as indicated by the vertical bar 290 which spans markers 230 in PCS lanes 220.

Figure 3A:
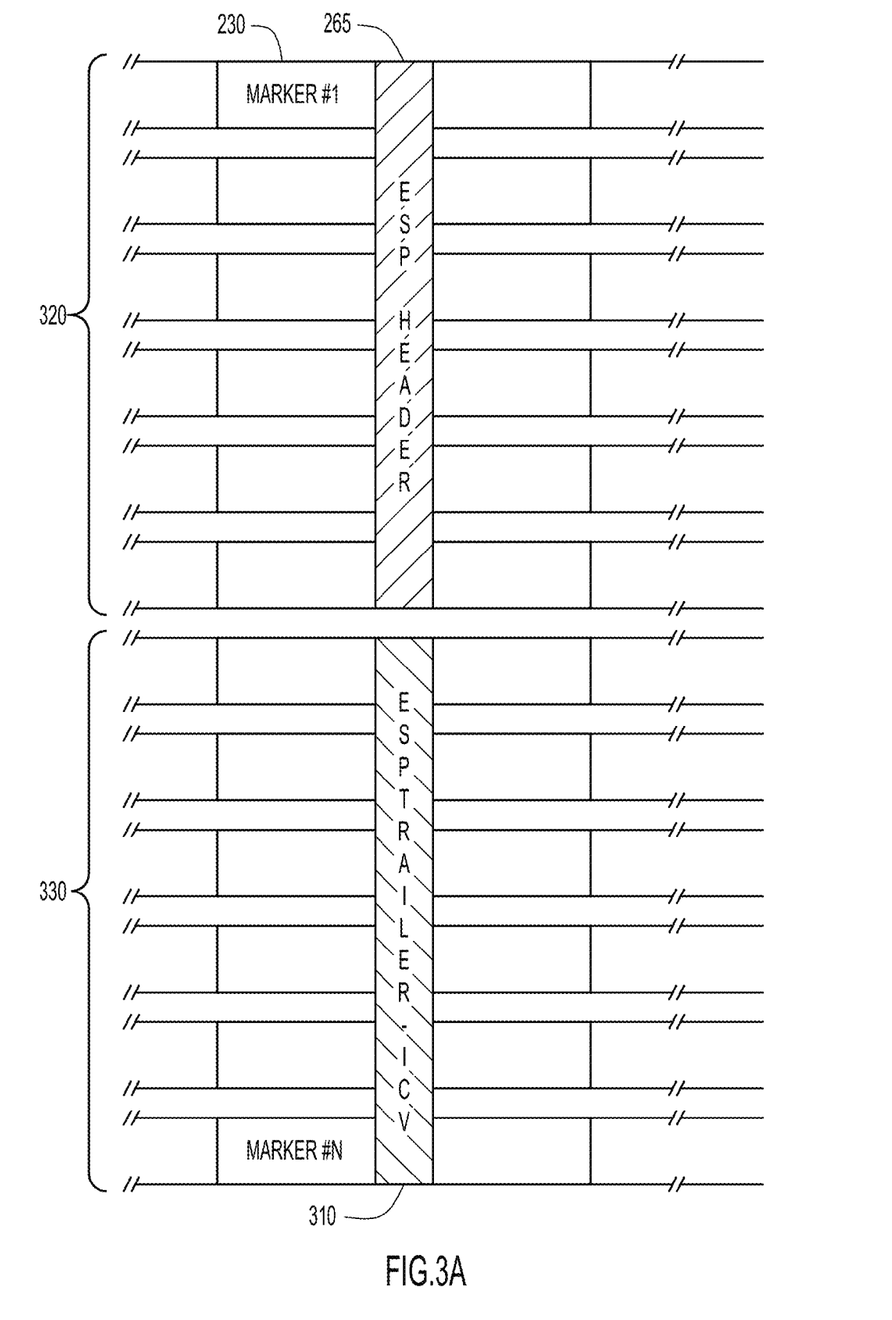
FIGS. 3a and 3b are schematic diagrams illustrating header and trailer position variations for adding security information to PCS virtual lane markers.
Figure 3B:
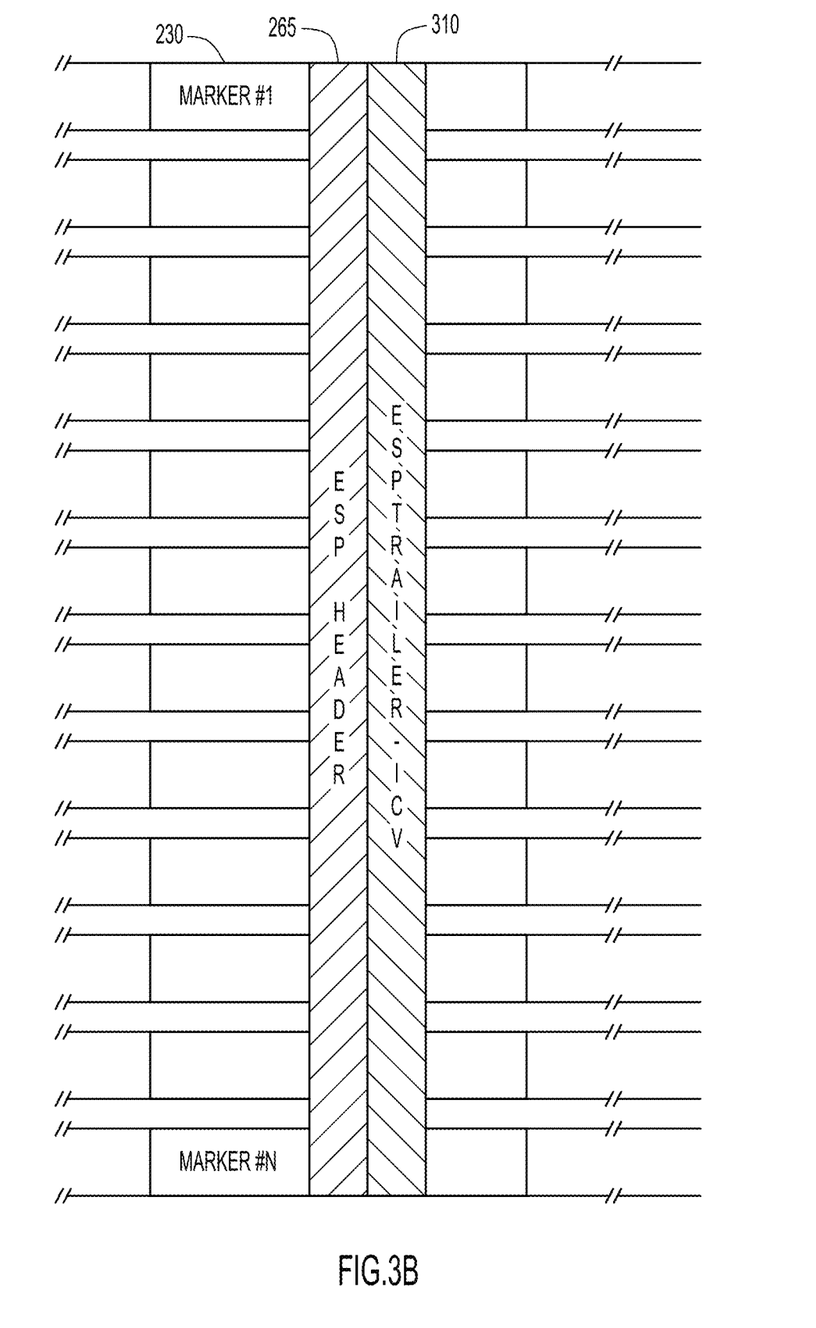

Example regions within the PCS lane markers 230 for which ESP header and trailer (ICV) information may be added to markers 230 are shown in FIGS. 3A and 3B. In FIG. 3A, the ESP header information 265 is added to markers 320 and ESP trailer (ICV) information 310 is added to markers 330. In FIG. 3B, the ESP header 265 and ESP trailer information 310 is added across one or more of markers 230. It should be understood that any combination of positions and number of bytes may be used to distribute the ESP header 265 and ESP trailer 310 information among markers 230. For example, one set of markers, e.g., marker 230, may contain ESP header information, while the next set of markers, e.g., marker 240, may contain ESP trailer information such that ESP header and trailer information is alternated among sets of markers.

ESP is a member of the Internet Protocol Security (IPsec) protocol suite. IPsec provides origin authenticity, integrity and confidentiality protection of packets. ESP also supports encryption-only and authentication-only configurations. The ESP header and trailer may contain, e.g., the following information:

Security Parameters Index (32 bits): Arbitrary value used (together with the destination IP address) to identify the security association of the receiving party.

Sequence Number (32 bits): A monotonically increasing sequence number (incremented by 1 for every packet sent) to protect against replay attacks. There is a separate counter kept for every security association.

Payload data (variable): The protected contents of the original IP packet, including any data used to protect the contents (e.g. an Initialization Vector for the cryptographic algorithm). The type of content that was protected is indicated by the Next Header field.

Padding (0-255 octets): Padding for encryption, to extend the payload data to a size that fits the encryption's cipher block size, and to align the next field.

Pad Length (8 bits).

Size of the padding (in octets).

Next Header (8 bits).

Type of the next header. The value is taken from the list of IP protocol numbers.

ICV (multiple of 32 bits) A variable length check value. It may contain padding to align the field to an 8-octet boundary for IPv6, or a 4-octet boundary for IPv4. The ICV is calculated over the ESP header, the payload data, and the ESP trailer. The receiver calculates the ICV value and checks it against this value (which is calculated by the sender) to verify integrity.

Of interest in the ESP header and trailer are the Security Parameters Index (SPI), Sequence Number (SEQ), Initialization Vector (IV) and ICV. These variables are added to PCS lane markers as described herein. While these four variables are described herein, remaining ESP header and trailer variables may also be added. For example, due to the nature of the PCS lanes as employed herein, an ESP "next header" variable may or may not be used. An example mapping of the SPI, SEQ, IV, and ICV are illustrated in FIGS. 4 and 5.

A block cypher or other cryptographic primitive may be applied to the techniques described herein. For block cyphers, an IV or starting variable generally is a fixed-size input to a cryptographic primitive that may be required to be random or pseudorandom. Randomization is important for certain cryptographic schemes to achieve semantic security, a property whereby repeated usage of the scheme under the same key does not allow an attacker to infer relationships between segments of the encrypted message. For block ciphers, the use of an IV is described by way of modes of operation which generally refers to a cryptographic algorithm, e.g., for block cyphers, electronic code books, block chaining, or feedback modes. Randomization is also required for other primitives, such as universal hash functions or message authentication codes based on randomization.

Some cryptographic primitives require the IV only to be non-repeating, and the required randomness is derived internally. In this case, the IV is commonly called a nonce (number used once), and the primitives are described as stateful as opposed to randomized. This is because the IV need not be explicitly forwarded to a recipient but may be derived from a common state updated at both sender and receiver side. However, in practice, a short nonce is still transmitted along with the message in order to consider message loss. In this regard, some of the IV in the ESP header or other data that may be used to achieve information security as described herein may be considered a nonce. An example of a stateful encryption scheme is a counter mode of operation, e.g., a Galois counter mode cypher, which uses a sequence number as a nonce. Even though a nonce, indicates that the number is only used once, that concept does not need infer once in a lifetime or in perpetuity, but may imply uniqueness on a per session, on a per timeframe basis or based on another delimiting metric.

Figure 4:
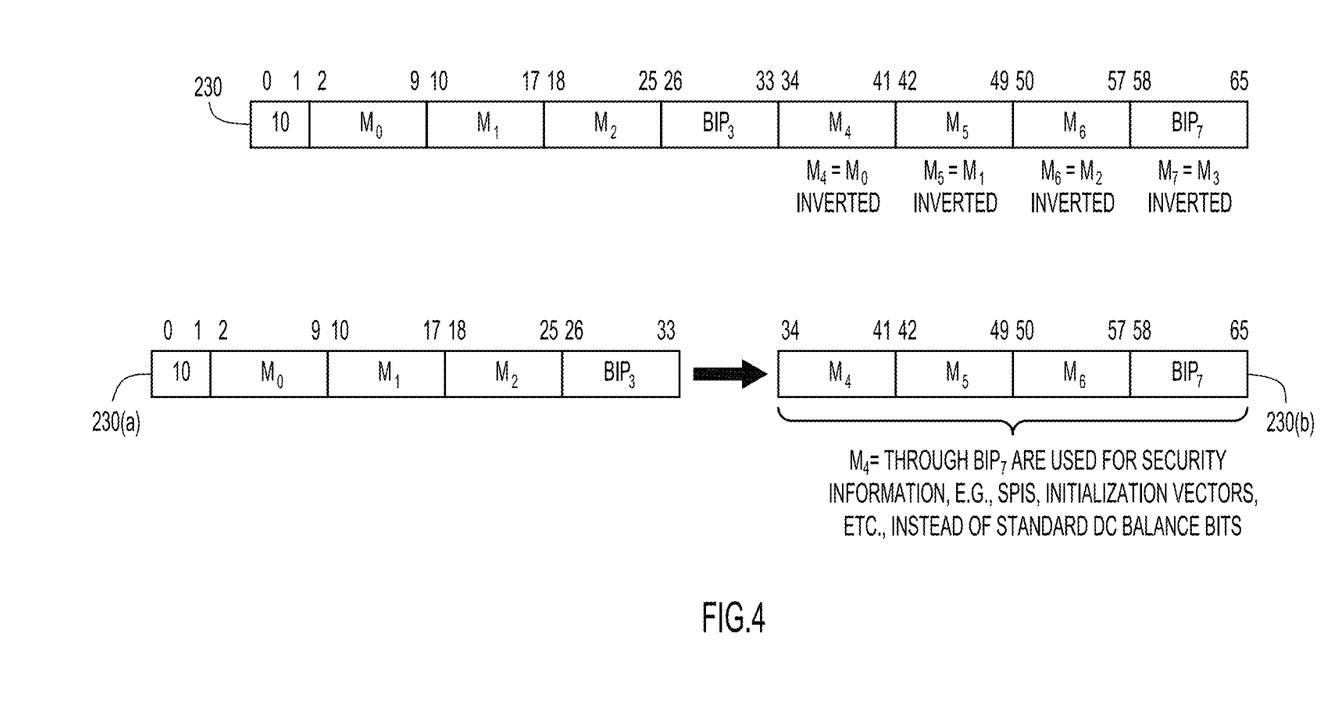
FIG. 4 is a schematic diagram illustrating an example PCS virtual lane marker format with example byte positions for adding security information.
Figure 5:
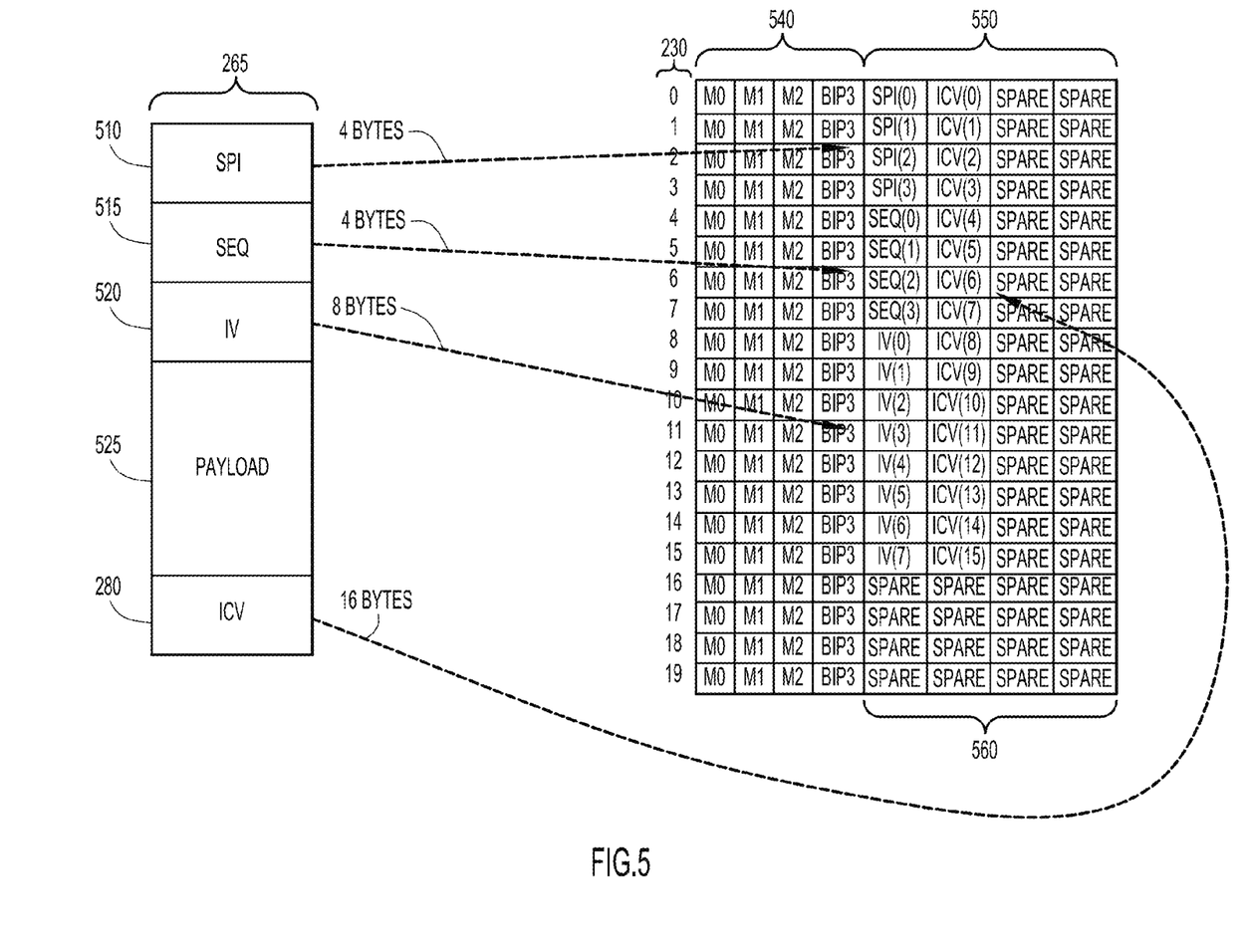
FIG. 5 is a schematic diagram illustrating example mapping of security information into a plurality of PCS virtual lane markers.

Referring to FIG. 4, a PCS lane marker is shown, e.g., one of PCS lanes markers 230 shown in previously described figures. PCS lane marker 230 depicts standard 66 bit lane marker positions used in typical PCS lane markers. PCS lane marker 230 follows the standard 64b/66b scheme with regard to the PCS encoding structure. PCS encoders output 66 bits that are generated from the original 64 bits, i.e., 8 bytes. The output of the PCS encoder includes a two bit synchronization (sync) header and 64 bits of encoded data and/or control information. The sync header is shown in bit positions 0 and 1 as indicated in FIG. 4. PCS lane marker 230 has a sync header bit values of "10" binary (b). A sync header of 01b indicates that the 8 byte block is all data, while the 10b sync header indicates that a combination of block type and/or data is contained within the 8 byte transmission block. In this example, the block type of 10b indicates that marker 230 contains control information.

The remaining 64 bits are shown as eight bytes (eight bit per byte) labeled as M0, M1, M2, BIP3, M4, M5, M6, and BIP7. M0, M1, and M2, comprise a unique coding to allow the receiver to determine the PCS lane number, while BIP3 is a standard Bit Interleave Parity (BIP) error byte that is used to determine errors based on parity across numerous data bits, e.g., in the 16,383 66B data blocks between marker 230 and 240 (FIG. 2A). In typical PCS marker implementations, M4, M5, M6, and BIP7 are bitwise inversions of M0, M1, M2, and BIP3, i.e., each zero bit in M0, M1, M2, and BIP3 becomes a one bit in M4, M5, M6, and BIP7, and each one bit in M0, M1, M2, and BIP3, becomes a zero bit in M4, M5, M6, and BIP7.

The inverted bits provide direct current (DC) balanced signals. DC balanced signals are used in communications systems to prevent bit errors when passing through circuits that may have capacitive coupling or transformers. Bit errors can occur when a series of 1's create a DC level that charges the capacitor of a high-pass filter used as an alternating current (AC) coupler, thereby incorrectly bringing the input down to a 0-level. In order to avoid these kinds of bit errors, most line codes, e.g., 8/10b or 64/66b line codes, are designed to produce DC balanced waveforms. The most common classes of DC balanced line codes are constant-weight codes and paired-disparity codes.

As shown in FIG. 4, marker 230 has been divided into two parts 230(a) and 230(b). In this example, part 230(a) contains standard M0, M1, M2, and BIP3 bytes while part 230(b) replaces M4, M5, M6, and BIP7 with ESP header and trailer information according to the techniques described herein in order to provide PCS lane security. As indicated in FIG. 4, ESP information such as SPIs and IVs are added to the bytes in part 230(b). DC balance may be provided by way of other mitigating techniques that are described hereinafter.

It should be noted that current (O/E) and (E/O) solutions have relied on typical binary multiples such as 2, 4, 8, etc., or multiples of 10 or 100. Thus, Ethernet interfaces are typically 1, 10, 40, or 100 GbE, while optical interfaces of 400 and 1,000 GbE (terabit) are on the horizon. However, these speeds do not necessarily provide optimum solutions for either electrical, optical, or combinations of both electrical and optical media. For example, buyers of network bandwidth may desire more granulated bit rates that provide more data bandwidth management flexibility, as well as the ability to more finely control network costs. For example, data rates of 25, 50, or 250 GbE may be desirable, as well as further data rate refinements. As such, different PCS marker formats may be employed to support any multiple of the virtual lane bandwidth. DC balance for various marker formats is generally described hereinafter.

Turning now to FIG. 5, a schematic diagram illustrating the example mapping of ESP security information into a plurality of PCS virtual lane markers is described. FIG. 5 depicts how individual lane security information is distributed across 20 markers 230, i.e., n=20 (FIG. 2A). The security information in this example comprises ESP header information 265 and ESP trailer information 280 (FIG. 2C). Markers 230 have been divided into two parts 540 and 550. In this example, part 540 contains standard M0, M1, M2, and BIP3 bytes, the same bytes 230(a) shown in FIG. 4. Part 550 replaces M4, M5, M6, and BIP7 bytes with ESP header and trailer information according to the example format shown in FIG. 3B.

As shown in FIG. 5, ESP header 265 has a four byte SPI 510, a four byte SEQ 515, and an eight byte SPI 520. ESP trailer comprises a 16 byte ICV 280. The ESP header information 265 is mapped to byte positions that approximate the M4 byte position shown in FIG. 4. Similarly, ICV 270 is mapped to byte positions that approximate the M5 byte position. The mappings are indicated by dashed arrows originating at SPI 510, SEQ 515, SPI 520, and ICV 280. To further illustrate, each byte in SPI 510 is enumerated as SPI(0), SPI(1), SPI(2), and SPI(3), respectively, and mapped to corresponding markers 230(0), 230(1), 230(2), and 230(3). In a similar fashion, each byte in SEQ 515 is enumerated as SEQ (0), SEQ(1), SEQ(2), and SEQ(3), respectively, and mapped to corresponding markers 230(4), 230(5), 230(6), and 230(7). As viewed in FIG. 5, IV 520 and ICV 280 are mapped across multiple ones of markers 230 in a self explanatory manner like the mapping of SPI 510 and SEQ 515. By virtue of these techniques, the same SPI, SEQ, IV, and XORed ICV can be used for all PCS lanes and distributed across the associated markers 230.

Also shown in FIG. 5, are a plurality of spare bytes that remain in part 550 and are collectively shown at reference numeral 560. Typical spare data areas are unused and can be set to values that maintain DC balance, but may also be used to increase the robustness of the security algorithms according to one embodiment Thus, as can be appreciated, the ESP header and trailer, and other security information may be distributed in any manner or fashion. For example it may be beneficial to distribute ESP header information 265 and ICV 270 over various locations in the spare bytes 560 in order to assist in maintaining DC balance during transmission and reception. In other examples for maintaining DC balance, the spare bytes can be set to various values, internal byte boundaries can be ignored, or 8/10b PCS encoding may be employed within data part 550.

Figure 6:
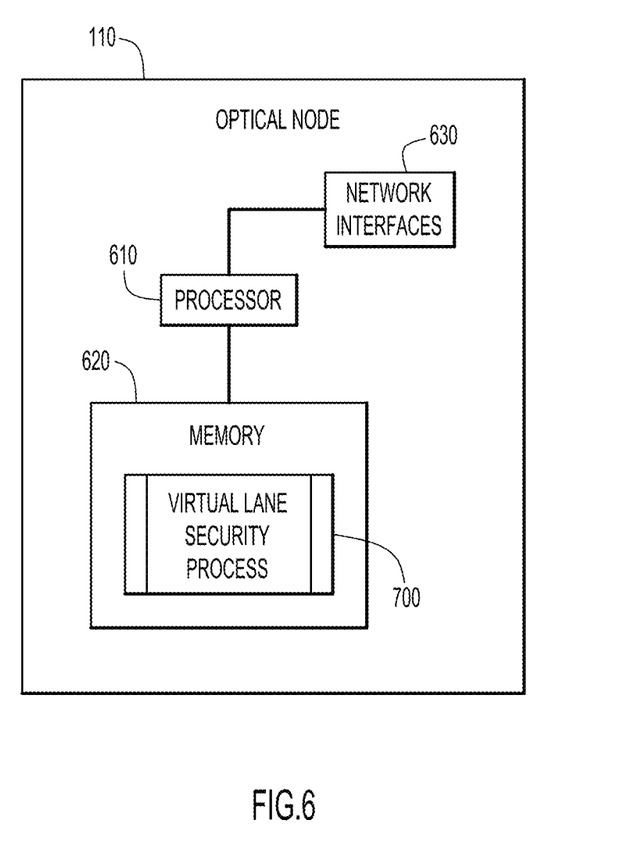
FIG. 6 is a block diagram of an apparatus configured to perform the PCS virtual lane security process according to the techniques presented herein.

FIG. 6 shows an example block diagram of an optical node, e.g., optical node 110, is shown that is configured according to the techniques described herein. Optical node 110 may comprise a processor 610, memory 620, and a plurality of network interfaces 630 for various forms of network connectivity. Processor 610 may be a programmable processor, e.g., microprocessor, digital signal processor (DSP), or microcontroller or a fixed-logic processor such as an application specific integrated circuit (ASIC) or Field Programmable Gate Array (FPGA). As such, processor 610 may represent plural processors within the optical node that perform general, programmable, and specific fixed logic operations, e.g., to perform PCS encoding and encryption. The processor 610 may comprise a processor with a combination of fixed logic and programmable logic, e.g., a System on a Chip (SoC), ASIC or FPGA with fixed logic, and a microprocessor and memory section.

The memory 620 may be of any type of tangible processor readable memory (e.g., random access, read-only, etc.) that is encoded with or stores instructions, such as virtual lane security process 700, e.g., for execution by processor 610. Thus, software or process 700 may be executed by software, firmware, fixed logic, or any combination thereof that cause the processor 610 to perform the functions described herein. Briefly, software 700 provides security for the virtual PCS lanes and their underlying data as described herein. In general, software may be embodied in a processor readable medium that is encoded with instructions for execution by a processor that, when executed by the processor, are operable to cause the processor to perform the functions described herein.

The network interfaces 630 generally comprise interfaces typically encompassed within optical nodes for reception of data and processing at various network layers for ultimate transmission at the PHY layer, e.g., optical ports. For example, there is an interface for receiving network traffic that is at a higher data rate that is subdivided into lower data rate traffic for PCS lane processing. By way of example, 100 GbE may be subdivided into 20, 5 GbE PCS lanes (20 lanes×5 GbE per lane=100 GbE) such as those shown in FIG. 5, or ten, 10 GbE PCS lanes (10 lanes×10 GbE per lane=100 GbE).

At this point, it becomes beneficial to briefly describe the IEEE 802.3ba protocol stack in simplified terms. In general, traffic may come into, i.e., be received by, a device on a PHY layer, e.g., layer 1 of the Open Systems Interconnection (OSI) model. The PHY layer may be by way of various transmission media, e.g., Radio Frequency (RF), optical, or electrical. If the network device is a source device it may generate the traffic without a receiving the traffic. The PHY signals are converted to a layer 2 protocol such as the Media Access Control (MAC) layer. Once received or generated, the traffic data transit a conceptual Media Independent Interface (MII) to the PCS layer. MII lanes may by in an m-AUI (Attachment Unit Interface) format where m denotes speed, e.g., X, XL, and C refer to 10, 40, and 100 GbE, respectively. After the PCS layer, the data are ready for forwarding over another PHY layer. To further transmission of the data at the PHY layer, the data transit a Physical Media Attachment (PMA) layer according to the IEEE 802.3 protocol stack. Once through the PMA, the data are supplied for PHY transmission via the Physical Media Dependent (PMD) layer.

The PCS layer may combine PCS lanes prior to forwarding to the PMA/PMD. For example, two PCS lanes may be combined into one data lane such that, e.g., the 20 PCS lanes 230 described in connection with FIG. 5 become 10 data lanes. The 10 lanes are forwarded to the PMA/PMD layer. The PMD may further combine the 10 lanes into four PHY lanes such as optical (or RF) lanes that have data rates that currently can outpace the data rates achieved over comparable electrical media. Reciprocal data subdivision processes occur on the side receiving data over the PHY media to obtain the original PCS lanes for further processing, e.g., decryption. Accordingly, any PCS lane may be sent over any optical fiber by way of the potential combinations provided by the various layers described above after the data originally input to the optical node are distributed across the PCS lanes.

Figure 7:
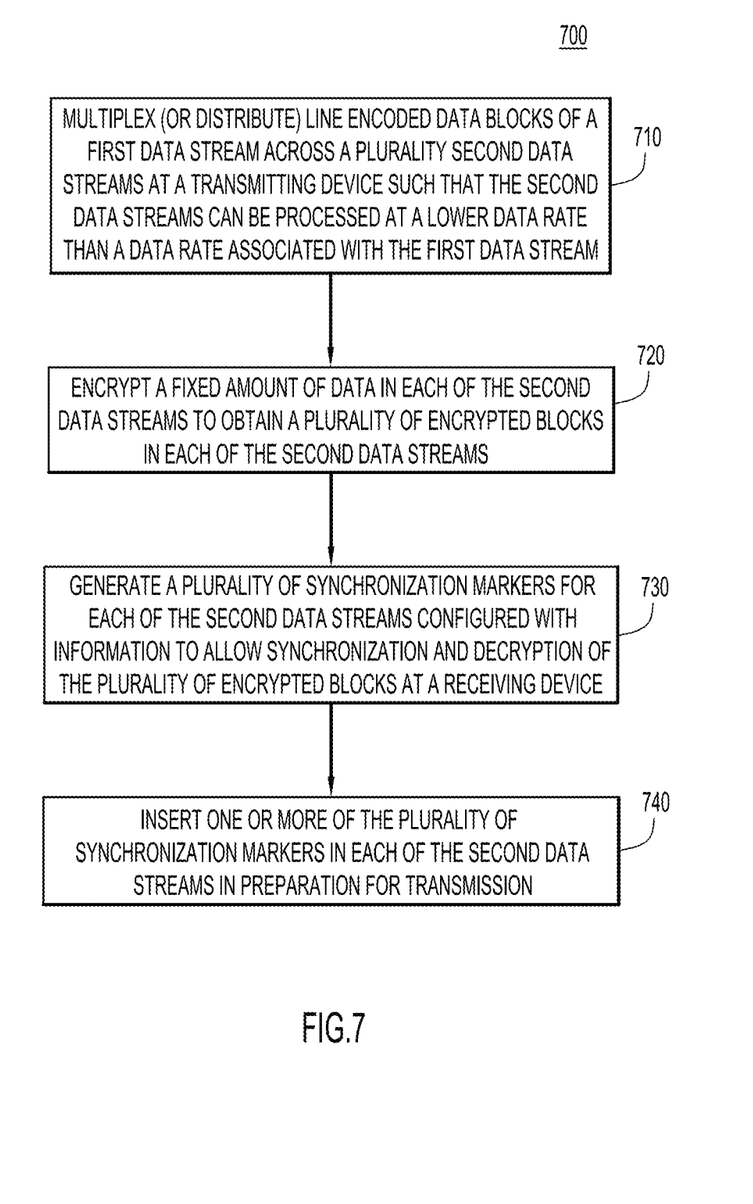
FIG. 7 is a high-level flowchart of a method for implementing the PCS virtual lane security process.

FIG. 7 is a high-level flowchart of a method for implementing the PCS virtual lane security process 700. At 710, line encoded data blocks of a first data stream are distributed or distributed across a plurality second data streams at a transmitting device such that the second data streams can be processed at a lower data rate than a data rate associated with the first data stream. For example, the line encoded data blocks may be encoded according any line code or baseband modulation such as the 64/66B line code. The first and second data streams provide for differential data transmission rates among various physical media.

At 720, a fixed amount of data in each of the second data streams is encrypted to obtain a plurality of corresponding encrypted blocks in each of the second data stream. In the examples shown in the various figures, 16,383 bytes are typically employed by IEEE 802.3 virtual lanes that are delineated by the lane markers. This is a fixed amount of data that ensures that the PCS lane markers align at the receiver for synchronizing and aligning the encrypted data blocks within each PCS lane for decryption and combining back into a higher data rate serial format. It will be appreciated that the fixed amount of data may vary in size and range as long as the size criteria are known to the transmitter and receiver At 730, a plurality of synchronization markers are generated for each of the second data streams that are configured with information to allow synchronization and decryption of the plurality of encrypted blocks at a receiving device. As described herein, the markers are configured with lane identifiers, as well as initialization vector, starting variable, a number only used once (nonce) and block cypher initialization number. The markers may conform, in part, to IEEE 802.3 based PCS lane markers and modified to provide for decryption at a receiver. By way of example, the marker may contain IPsec information, e.g., Advanced Encryption Standard (AES) Galois/Counter Mode (AES-GCM), but may contain decryption information for other cryptographic techniques that may be adapted or are currently employed in comparable lane marking scenarios.

At 740, one or more of the plurality of synchronization markers are inserted in each of the second data streams in preparation for transmission. The markers are generally added in proportion to the amount of data to be transmitted. One important issue for PHY transmission is generating markers that comprise information configured to provide DC balance/bias when transmitted over physical transmission media in order to reduce, among other things, unwanted coupling effects associated with unbalance data transmission.

A further advantage of the techniques described herein is that the security information, e.g., IPsec, for decrypting the encrypted blocks at the receiving device may be distributed across the one or more synchronization markers added to each of the encrypted blocks. Distributing the security specific information across multiple markers facilitates DC balancing by way of allowing a number of spare data regions to be manipulated accordingly. As is generally understood, the processes described in connection with FIG. 7 for a data transmission are generally performed in an inverse or reverse-like process on the receiving end to ultimately obtain the original data stream.

Figure 8:
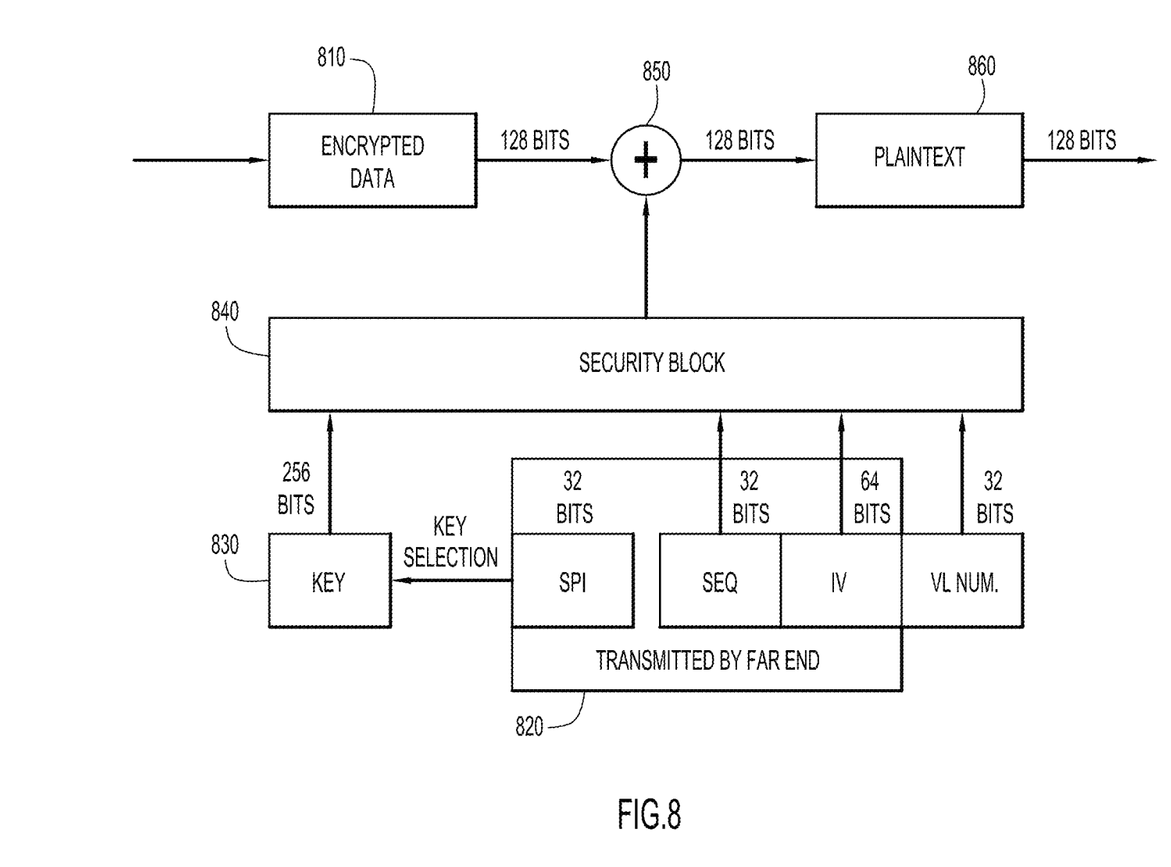
FIG. 8 is a block diagram of an example PCS virtual lane decryption process employed by a second optical node receiving encrypted PCS data streams from the first optical node.

Referring now to FIG. 8, a block diagram of an example PCS virtual lane decryption process employed by a receiver, e.g., optical node 120 (FIG. 1), that receives encrypted PCS lane data blocks that have been aggregated for PHY transmission from a transmitting optical node. FIG. 8 shows one example for obtaining the original plaintext data supplied to the transmitting optical node, e.g., using an inverse-like mechanism of the process used by the transmitter. Briefly, FIG. 8 shows various arrows generally showing data flow and their associated number of bits, that typically indicate that a block cypher has been employed at the transmitter, i.e., a 128 bit block cypher, as can be appreciated by those familiar with various encryption techniques.

At 810, the aggregated and encrypted data have been divided into their encrypted data blocks according to the number of PSC lanes employed by the transmitter, and fed to a decryption engine in 128 bit blocks. At 820, the security information transmitted in a plurality of synchronization markers, e.g., PCS lane markers, are unmapped and reassembled into their original data constructs. As shown at 820, the 32 bit (4 byte) SPI, 32 bit SEQ, 64 bit IV, and 32 bit virtual lane (VL) number (e.g., derived from M0, M1, and M2) transmitted by the far end are obtained. In this example, the SPI identifies, e.g., a security association (SA), whereby a decryption key may be selected at 830, and fed to security block 840.

Security block 840, employs the 256 bit key 830, the 32 bit SEQ, 64 bit IV, and the 32 bit VL number to produce a 128 bit sub-key. The sub-key is Boolean XORed at 850 with each 128 bit block 810. The output of the XOR operation 850 is decrypted data 860, e.g., data originally input to encryption engine 255 (FIG. 2C). It should be noted that by these techniques, the encrypted PCS lane data blocks may be decrypted individually or in parallel. The decrypted data 860 are eventually combined into an original PCS encode data stream, e.g., stream 200 (FIG. 2).

In brief summation, security information is generated that includes a unique IV or other security protocol information. The security information is distributed or allocated across some or all of the of the virtual data streams in a virtual lane alignment marker in a portion of the alignment marker typically used to maintain DC transmission balance, but that otherwise does not provide useful information.

The above description is intended by way of example only.

What is claimed is:

1. A method comprising:
   distributing line encoded data blocks of a first data stream across a plurality of second data streams at a transmitting device such that the second data streams can be processed at a lower data rate than a data rate associated with the first data stream;
   encrypting a fixed amount of data in each of the second data streams to obtain a plurality of corresponding encrypted blocks in each of the second data streams;
   generating a plurality of synchronization markers for each of the second data streams configured with information to allow synchronization of the plurality of encrypted blocks at a receiving device;
   generating cryptographic information that allows decryption of the plurality of encrypted blocks at the receiving device;
   dividing the cryptographic information into a plurality of portions;
   inserting each portion of the cryptographic information into one of the plurality of synchronization markers, wherein the portions of cryptographic information are inserted into synchronization markers corresponding to at least two of the plurality of second data streams; and
   inserting one or more of the plurality of synchronization markers into each of the second data streams in preparation for transmission.

2. The method of claim 1, wherein generating the cryptographic information includes generating one or more of an initialization vector, starting variable, a number only used once (nonce) and block cypher initialization number.

3. The method of claim 1, wherein generating the plurality of synchronization markers includes generating synchronization markers comprising Institute of Electrical and Electronics Engineer (IEEE) 802.3 based Physical Coding Sublayer (PCS) lane markers comprising a lane identifier.

4. The method of claim 1, wherein the first data stream is configured for transport at optical data rates and the second data streams are configured for processing at the lower data rate by electrical components.

5. The method of claim 1, wherein generating the cryptographic information includes generating information configured to decrypt the encrypted blocks that were encrypted according the Internet Protocol Security (IPsec) protocol suite.

6. The method of claim 1, wherein generating the plurality of synchronization markers includes generating synchronization markers comprising information configured to provide direct current (DC) balance including the portions of the cryptographic information when transmitted over physical transmission media.

7. The method of claim 1, further comprising distributing security information for decrypting the encrypted blocks at the receiving device across the one or more synchronization markers added to each of the second data streams.

8. An apparatus, comprising:
   a memory;
   a processor coupled to the memory, and configured to:
      distribute line encoded data blocks of a first data stream across a plurality of second data streams at a transmitting device such that the second data streams can be processed at a lower data rate than a data rate associated with the first data stream;
      encrypt a fixed amount of data in each of the second data streams to obtain a plurality of corresponding encrypted blocks in each of the second data streams;
      generate a plurality of synchronization markers for each of the second data streams configured with information to allow synchronization of the plurality of encrypted blocks at a receiving device;
      generate cryptographic information that allows decryption of the plurality of encrypted blocks at the receiving device;
      divide the cryptographic information into a plurality of portions;
      insert each portion of the cryptographic information into one of the plurality of synchronization markers, wherein the portions of cryptographic information are inserted into synchronization markers corresponding to at least two of the plurality of second data streams; and insert one or more of the plurality of synchronization markers into each of the second data streams in preparation for transmission.

9. The apparatus of claim 8, wherein the processor is configured to generate cryptographic information comprising one or more of an initialization vector, starting variable, a number only used once (nonce) and block cypher initialization number.

10. The apparatus of claim 8, wherein the processor is configured to generate synchronization markers comprising Institute of Electrical and Electronics Engineer (IEEE) 802.3 based Physical Coding Sublayer (PCS) lane markers comprising a lane identifier.

11. The apparatus of claim 8, wherein the first data stream is configured for transport at optical data rates and the second data streams are configured for processing at the lower data rate by electrical components.

12. The apparatus of claim 8, wherein the processor is configured to generate cryptographic information comprising information configured to decrypt the encrypted blocks that were encrypted according the Internet Protocol Security (IPsec) protocol suite.

13. The apparatus of claim 8, wherein the processor is configured to generate synchronization markers comprising information configured to provide direct current (DC) balance including the portions of the cryptographic information when transmitted over physical transmission media.

14. The apparatus of claim 8, wherein the processor is further configured to distribute security information for decrypting the encrypted blocks at the receiving device across the one or more synchronization markers added to each of the second data streams.

15. One or more non-transitory computer readable storage media encoded with software comprising computer executable instructions and when the software is executed operable to:

distribute line encoded data blocks of a first data stream across a plurality of second data streams at a transmitting device such that the second data streams can be processed at a lower data rate than a data rate associated with the first data stream;

encrypt a fixed amount of data in each of the second data streams to obtain a plurality of corresponding encrypted blocks in each of the second data streams;

generate a plurality of synchronization markers for each of the second data streams configured with information to allow synchronization of the plurality of encrypted blocks at a receiving device;

generate cryptographic information that allows decryption of the plurality of encrypted blocks at the receiving device;

divide the cryptographic information into a plurality of portions;

insert each portion of the cryptographic information into one of the plurality of synchronization markers, wherein the portions of cryptographic information are inserted into synchronization markers corresponding to at least two of the plurality of second data streams; and insert one or more of the plurality of synchronization markers into each of the second data streams in preparation for transmission.

16. The computer readable storage media of claim 15, wherein the instructions operable to generate the cryptographic information comprise instructions operable to generate one or more of an initialization vector, starting variable, a number only used once (nonce) and block cypher initialization number.

17. The computer readable storage media of claim 15, wherein the instructions operable to generate the plurality of synchronization markers comprise instructions operable to generate synchronization markers comprising Institute of Electrical and Electronics Engineer (IEEE) 802.3 based Physical Coding Sublayer (PCS) lane markers comprising a lane identifier.

18. The computer readable storage media of claim 15, wherein the instructions operable to generate the plurality of synchronization markers comprise instructions operable to generate synchronization markers comprising information configured to provide direct current (DC) balance including the portions of the cryptographic information when transmitted over physical transmission media.

19. The computer readable storage media of claim 15, wherein the instructions operable to generate the cryptographic information comprise instructions operable to generate information configured to decrypt the encrypted blocks that were encrypted according the Internet Protocol Security (IPsec) protocol suite.

20. The computer readable storage media of claim 15, further comprising instructions operable to distribute security information for decrypting the encrypted blocks at the receiving device across the one or more synchronization markers added to each of the second data streams.

* * * * *